(No Model.)
W. E. MAULTBY.
ANIMAL TRAP.
No. 334,259. Patented Jan. 12, 1886.
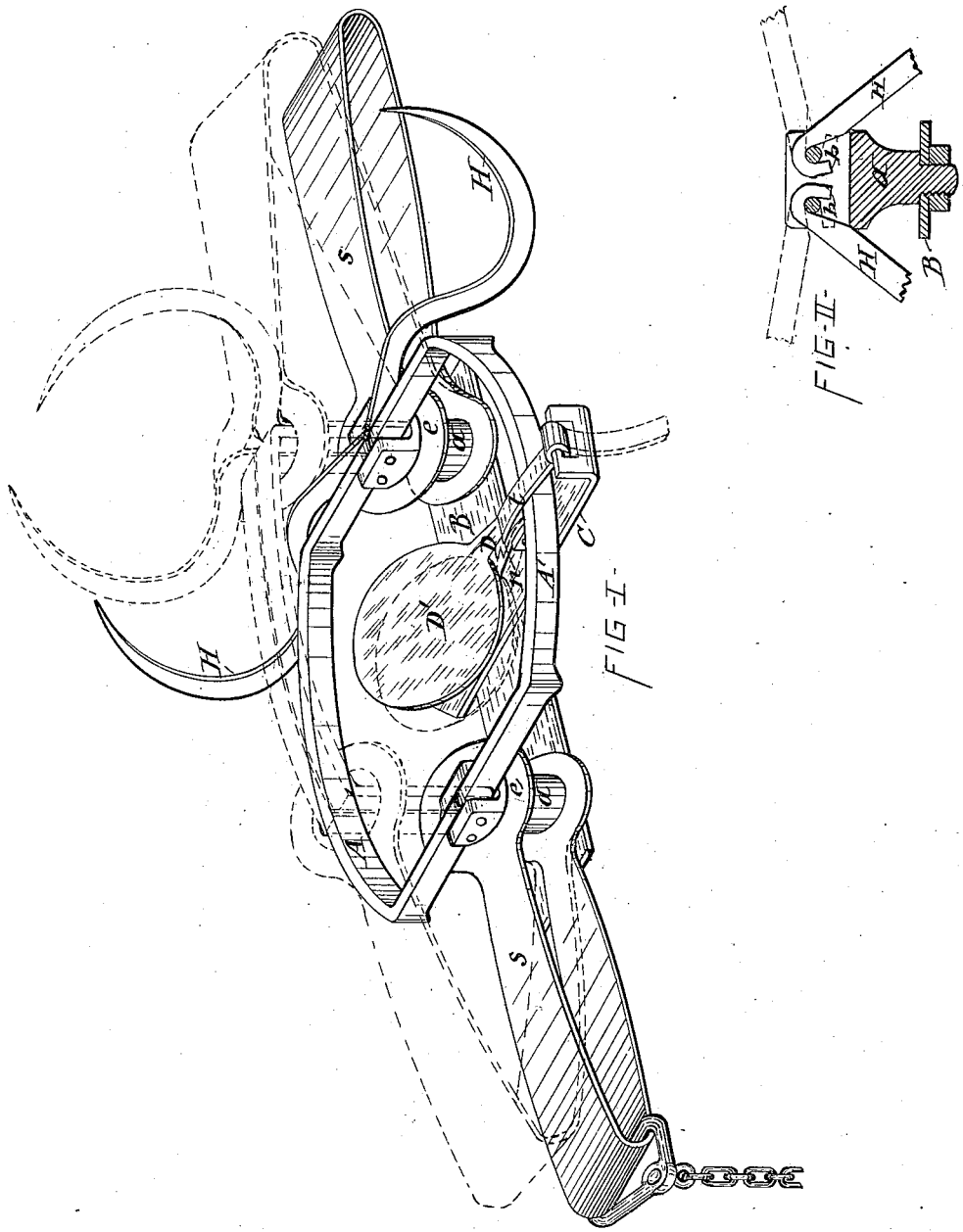
WITNESSES:
C. Bendixon
E. C. Cannon
INVENTOR:
William Edward Maultby
per Snell, Laass & Hey
his Attys

UNITED STATES PATENT OFFICE.

WILLIAM EDWARD MAULTBY, OF CHEBOYGAN, MICHIGAN, ASSIGNOR TO THE ONEIDA COMMUNITY, (LIMITED,) OF COMMUNITY, N. Y.

ANIMAL-TRAP.

SPECIFICATION forming part of Letters Patent No. 334,259, dated January 12, 1886.

Application filed October 19, 1885. Serial No. 180,350. (No model.)

*To all whom it may concern:*

Be it known that I, WILLIAM EDWARD MAULTBY, of Cheboygan, in the county of Cheboygan, in the State of Michigan, have invented new and useful Improvements in Animal-Traps, of which the following, taken in connection with the accompanying drawings, is a full, clear, and exact description.

This invention relates to the class of animal-traps in which two spring-actuated jaws are arranged to close over a tripping-lever, and are held in their open position by a latch engaging one of the jaws and the tripping-lever.

The object of this invention is to obtain a more secure hold on the entrapped animal, and thus render the trap more effective in its operation; and to that end it consists in the combination, with the tripping-lever, latch, spring, and the jaw which serves to compress the spring and is held by the latch, of two pivoted gripping-hooks lying across the spring to be actuated thereby, as hereinafter more fully described, and specifically set forth in the claims.

In the annexed drawings, Figure I is a perspective view of a trap provided with my improvements, and showing the same in its set position by full lines and in its sprung position by broken lines; and Fig. II is a detail view of the detachable connection of the gripping-hooks with the traps.

B represents the base of the trap. It consists of an elongated metal plate, to the ends of which are attached two posts, $a\ a$, having ears, on which are hinged the jaws A A'. Central between the posts $a\ a$ is an arm, C, secured to the base B, and projecting at right angles therefrom. On the said arm is pivoted the tripping-lever D, which terminates in a pan, D', over the center of the base B, and on the extremity of the arm C is hinged the latch $l$, which lies across one of the jaws, A', and engages by its free end with a notch, $n$, in the heel of the tripping-lever when the trap is set, as represented by full lines in Fig. I of the drawings.

The spring $s$, which actuates the jaws A A', is provided with an eye, $e$, by which it embraces the pivoted end of the two jaws, and in setting the trap the spring has to be compressed to allow the jaws A A' to open and the latch $l$ to be placed across the jaw A' and interlocked with the tripping-lever D, as illustrated in Fig. I of the drawings, and when so set the jaw A' acts as a lever for retaining the spring in its compressed condition.

A slight depression on the pan or free end D' of the tripping-lever D disengages it from the latch $l$, and thus releases the jaw A', which, together with its companion jaw, A, is then thrown into a closed position by the spring $s$.

Traps of the foregoing construction have been in public use for many years, but experience has proved that in some instances they have failed to effectually retain the entrapped animal, and to overcome this defect I now employ two gripping-hooks or curved prongs, H H, which I pivot on one of the posts $a$ in common with but independent of the jaws A A' at the outside of the ends thereof, by setting the ears of said post sufficiently apart to receive between them side by side the pivoted ends of the aforesaid jaws and hooks, and one set of pins pass through the ears of the post and intervening parts. The pivoted ends of the hooks H H are thus likewise embraced by the eye $e$ of the spring $s$ and actuated by said spring simultaneously with the jaws A A'. While the said jaws grip the leg of the animal the hooks H H are plunged into the body of the same. Inasmuch as the said gripping-hooks are wanted only for certain species of animals, it is desirable to have them detachable from the trap, and to accomplish this I provide the pivoting ends of the hooks with slots $b\ b$, extending into the hooks from one edge thereof and part way toward the heels of the same, as shown in Fig. II of the drawings, said slot allowing the hooks to be slipped onto and off from the pivoting-pins of the post $a$ when desired.

I do not limit myself to the application of a single set of hooks H to the described trap, as it is obvious that two sets of said hooks may be connected to the two posts.

Having described my invention, what I claim as new, and desire to secure by Letters Patent, is—

1. In combination with the spring-actuated jaws A A', the gripping-hooks H H, pivoted independently of the said jaws, and the spring $s$, for actuating said hooks, substantially as and for the purpose set forth.

2. The combination, with the jaws A A', of the gripping-hooks H H, pivoted independently of the said jaws at the outside of the ends thereof, and the spring s, embracing the pivoted ends of the jaws and hooks to actuate the same simultaneously, substantially as described and shown.

3. In combination with the jaws A A' and the hooks H H, the post a, having ears set apart to receive between them side by side the pivoted ends of the said jaws and hooks, and pins passing through said jaws and intervening parts, substantially as described and shown.

In testimony whereof I have hereunto signed my name and affixed my seal, in the presence of two attesting witnesses, at Cheboygan, in the county of Cheboygan, in the State of Michigan, this 29th day of August, 1885.

WILLIAM EDWARD MAULTBY. [L. S.]

Witnesses:
ARTHUR F. WATSON,
WM. H. MAULTBY.